United States Patent
Haneda et al.

(10) Patent No.: US 7,654,884 B2
(45) Date of Patent: Feb. 2, 2010

(54) METHOD OF POLISHING END SURFACES OF A SUBSTRATE FOR A RECORDING MEDIUM BY A GRAIN FLOW PROCESSING METHOD

(75) Inventors: Kazuyuki Haneda, Ichihara (JP); Yoshio Kawakami, Kawaguchi (JP)

(73) Assignee: Showa Denko K.K., Tokyo (JP)

( * ) Notice: Subject to any disclaimer, the term of this patent is extended or adjusted under 35 U.S.C. 154(b) by 203 days.

(21) Appl. No.: 11/660,924

(22) PCT Filed: Aug. 26, 2005

(86) PCT No.: PCT/JP2005/016050
§ 371 (c)(1),
(2), (4) Date: Feb. 23, 2007

(87) PCT Pub. No.: WO2006/025508
PCT Pub. Date: Mar. 9, 2006

(65) Prior Publication Data
US 2007/0254192 A1    Nov. 1, 2007

Related U.S. Application Data

(60) Provisional application No. 60/608,103, filed on Sep. 9, 2004.

(30) Foreign Application Priority Data

Aug. 31, 2004    (JP) ............................. 2004-252650

(51) Int. Cl.
B24B 1/00     (2006.01)
B24B 31/00    (2006.01)
B24B 7/19     (2006.01)
G11B 5/712    (2006.01)

(52) U.S. Cl. ................. 451/63; 451/28; 65/61; 428/846.9

(58) Field of Classification Search ............. 428/848, 428/846.9, 848.2, 848.3, 848.8, 542.8, 426, 428/900; 451/533, 526, 34, 28, 42, 51, 61, 451/63; 65/61, 21.2, 62; 438/759
See application file for complete search history.

(56) References Cited

U.S. PATENT DOCUMENTS 4,347,333 A * 8/1982 Lohr et al. .................... 106/10

(Continued)

FOREIGN PATENT DOCUMENTS

JP    11-221742 A    8/1999

(Continued)

OTHER PUBLICATIONS

Translation JP 11-221742.*
Translation JP 2003-260654.*
Translation JP 2003-260653.*

*Primary Examiner*—Kevin M. Bernatz
*Assistant Examiner*—Louis Falasco
(74) *Attorney, Agent, or Firm*—Sughrue Mion, PLLC

(57) ABSTRACT

The object of the invention is to provide a method of polishing the end surfaces of a substrate for a recording medium, which is capable of efficiently polishing the inner peripheral end surface and/or the outer peripheral end surface of the substrate preventing the reliability of performance of the recording medium from being impaired by the adhesion of the residual polishing material. According to the invention, there is provided a method of polishing end surfaces of a substrate for a recording medium wherein an inner peripheral end surface or an outer peripheral end surface of a substrate for a disk-like recording medium having a circular hole at the central portion thereof is brought into contact with a polishing medium obtained by dispersing polishing grains in a viscoelastic resin carrier and the polishing medium flows, thereby to polish the inner peripheral end surface or the outer peripheral end surface.

4 Claims, 1 Drawing Sheet

U.S. PATENT DOCUMENTS

| | | | |
|---|---|---|---|
| 6,280,294 B1 * | 8/2001 | Miyamoto | 451/34 |
| 2001/0008801 A1 * | 7/2001 | Toyama | 438/848 |
| 2002/0037686 A1 * | 3/2002 | Brown et al. | 451/42 |
| 2002/0058469 A1 * | 5/2002 | Pinheiro et al. | 451/526 |
| 2002/0073733 A1 * | 6/2002 | Akamatsu et al. | 65/17.2 |
| 2002/0160234 A1 * | 10/2002 | Sakawaki et al. | 428/848 |
| 2002/0187729 A1 * | 12/2002 | Osugi et al. | 451/28 |
| 2003/0205060 A1 * | 11/2003 | Iwabuchi et al. | 65/61 |
| 2004/0072522 A1 * | 4/2004 | Petroski et al. | 451/533 |

FOREIGN PATENT DOCUMENTS

| | | |
|---|---|---|
| JP | 2003-260653 A | 9/2003 |
| JP | 2003-260654 A | 9/2003 |
| WO | WO 01/028739 * | 4/2001 |

* cited by examiner

METHOD OF POLISHING END SURFACES OF A SUBSTRATE FOR A RECORDING MEDIUM BY A GRAIN FLOW PROCESSING METHOD

CROSS REFERENCE TO RELATED APPLICATION

This application is an application filed under 35 U.S.C. §111(a) claiming benefit pursuant to 35 U.S.C. §119(e) of the filing date of Provisional Application No. 60/608,103, filed on Sep. 9, 2004, pursuant to 35 U.S.C. §111(b).

TECHNICAL FIELD

The present invention relates to a method of polishing end surfaces of a substrate for a recording medium by a grain flow processing method and a method of producing a substrate for a recording medium by using the above method.

BACKGROUND ART

An aluminum substrate has been widely used as a substrate for a magnetic recording medium such as a magnetic disk. As the magnetic disks are being produced in smaller sizes and smaller thickness but must record data at a higher density, the aluminum substrate is now being gradually replaced by a glass substrate having superior surface flatness and substrate strength. As glass substrates for magnetic recording medium, there have been used chemically strengthening glass substrates for enhancing the substrate strength and crystallized glass substrates featuring increased substrate strength based on the crystallization.

Accompanying the trend toward high-density recording, further, the magnetic head, is being changed from a thin-film head to a magneto-resistive head (MR head) and to a giant magneto-resistive head (GMR head). It is therefore expected that reproducing the contents the magnetic recording medium of the glass substrate by using a magneto-resistive heads will become standard in the future.

Thus, a variety of improvements have been made to the magnetic disk for high-density recording. Advances in the magnetic disk, however, are also accompanied by new problems concerning the glass substrate for the magnetic recording medium. One of the problems is to cleanse the surfaces of the glass substrate. That is, adhesion of a foreign matter on the surfaces of the glass substrate could become a cause of defects in the thin film formed on the surfaces of the glass substrate or a cause of protuberances formed on the surfaces of the thin film. Further, in reproducing the contents of the magnetic recording medium of the glass substrate by using a magneto-resistive head, if the flying height (floating height) of the head is reduced to increase the recording density, there may often occur erroneous reproducing operations or a phenomenon that the reproduction is not accomplished. The cause is that the protuberances formed on the surface of the magnetic disk, due to particles on the glass substrate, turn into thermal asperity, generating heat at the magneto-resistive head, varying the resistance of the head, and adversely affecting the electromagnetic conversion.

A principal cause of foreign matter on the surface of the glass substrate for the magnetic recording medium described above stems from the end surface of the glass substrate not being smooth and, hence, the end surface abrades the wall surface of the resin casing, whereby resin or glass particles formed by the abrasion, as well as other particles trapped on the inner peripheral end surface and the outer peripheral end surface of the glass substrate, adhere to the surfaces.

Patent document 1 (JP-A-11-221742) discloses a polishing method wherein a disk-like glass substrate (substrate for a recording medium) having a circular hole at the central portion is immersed in a polishing solution containing free grains, and the inner peripheral end surfaces and/or the outer peripheral end surfaces of the glass substrate are polished by being brought into rotational contact with a polishing brush or a polishing pad by using the polishing solution containing the free grains.

However, use of the polishing brush together with the slurry is not capable of favorably polishing the substrate for a recording medium such as a small hard disk (e.g., a doughnut-shaped substrate having an inner diameter of not larger than 7 mm). Further, the conventional slurry contains cerium oxide and the like which cannot be easily removed by washing. Besides, the residual cerium oxide may make it difficult to obtain satisfactory reliability in performance in the applications where a highly reliable performance is required, such as in the use of a car-mounted hard disk (HD) and the like.
[Patent document 1] Japanese Unexamined Patent Publication (Kokai) No. 11-221742

DISCLOSURE OF THE INVENTION

It is, therefore, an object of the present invention to provide a method of polishing a substrate which is suited for polishing a substrate for a recording medium and, particularly, a substrate for a small recording medium. Another object of the present invention is to provide a polishing method capable of efficiently polishing the inner peripheral end surface and/or the outer peripheral end surface of the substrate. A further object of the present invention is to provide a polishing method, capable of forming a polished substrate, while preventing the reliability of performance from being impaired by the adhesion of the residual polishing material.

The present invention provides a method of polishing the end surfaces of a substrate for a recording medium and a method of producing a substrate for a recording medium using the above method as described below.

(1) A method of polishing end surfaces of a substrate for a recording medium wherein an inner peripheral end surface or an outer peripheral end surface of a substrate for a disk-like recording medium having a circular hole at the central portion thereof is brought into contact with a polishing medium obtained by dispersing polishing grains in a viscoelastic resin carrier and the polishing medium flows, thereby to polish the inner peripheral end surface or the outer peripheral end surface.

(2) The method of polishing end surfaces of a substrate for a recording medium according to (1) above, wherein the inner peripheral end surface and the outer peripheral end surface are polished simultaneously.

(3) The method of polishing end surfaces of a substrate for a recording medium according to (1) or (2) above, wherein the polishing grains are diamond grains.

(4) The method of polishing end surfaces of a substrate for a recording medium according to any one of (1) to (3) above, wherein the diameter of the circular hole is not larger than 7 mm.

(5) A method of producing a substrate for a recording medium by using the polishing method of any one of (1) to (4) above.

(6) A substrate for a recording medium, produced by the method according to (5).

(7) A recording medium, produced by using the substrate according to (6).

Unlike the conventional methods that use a polishing brush, the polishing method of the present invention is capable of effecting the polishing favorably even when the disk-like substrate for a recording medium has a very small inner diameter.

Further, the substrate is polished by using polishing grains in the flowing polishing medium, making it possible to polish both the inner peripheral end surface and the outer peripheral end surface simultaneously.

Further, the disk-like substrates for recording media can be polished in a state of being stacked one upon the other in a plural number to conduct the polishing efficiently.

According to the method of the present invention, further, the polishing is effected favorably by using diamond grains or grains such as of silicon carbide. Therefore, there is no need of washing, there is no problem of a decrease in the reliability of performance caused by residual cerium oxide, and the performance is obtained by maintaining a sufficient degree of reliability.

BEST MODE FOR CARRYING OUT THE INVENTION

Figure 1:
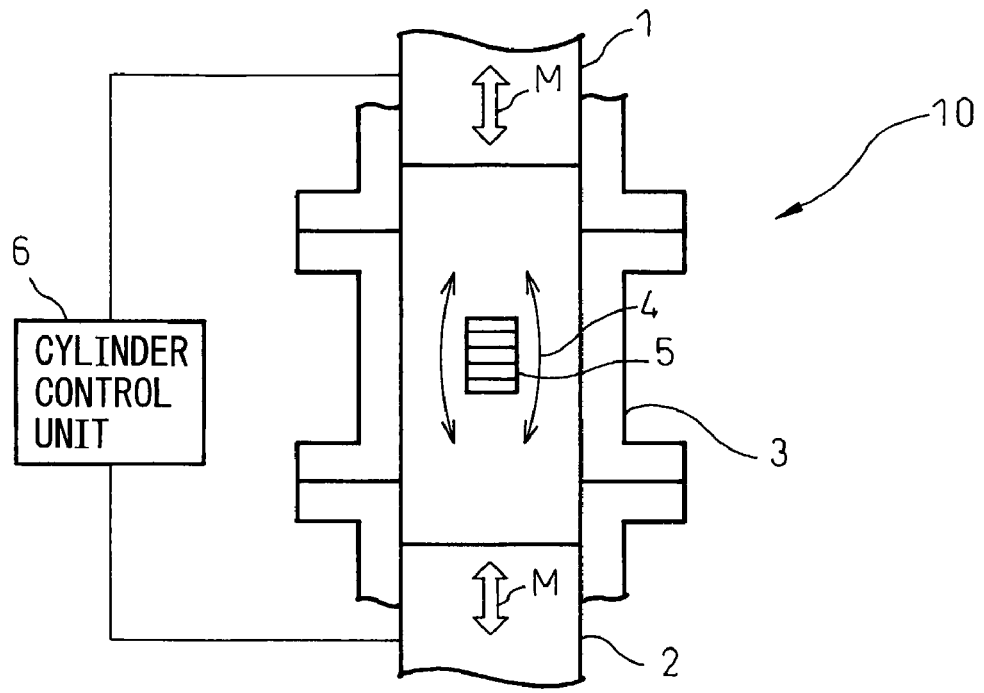
FIG. 1 is a perspective view of a device used for the grain flow processing.
Figure 2:
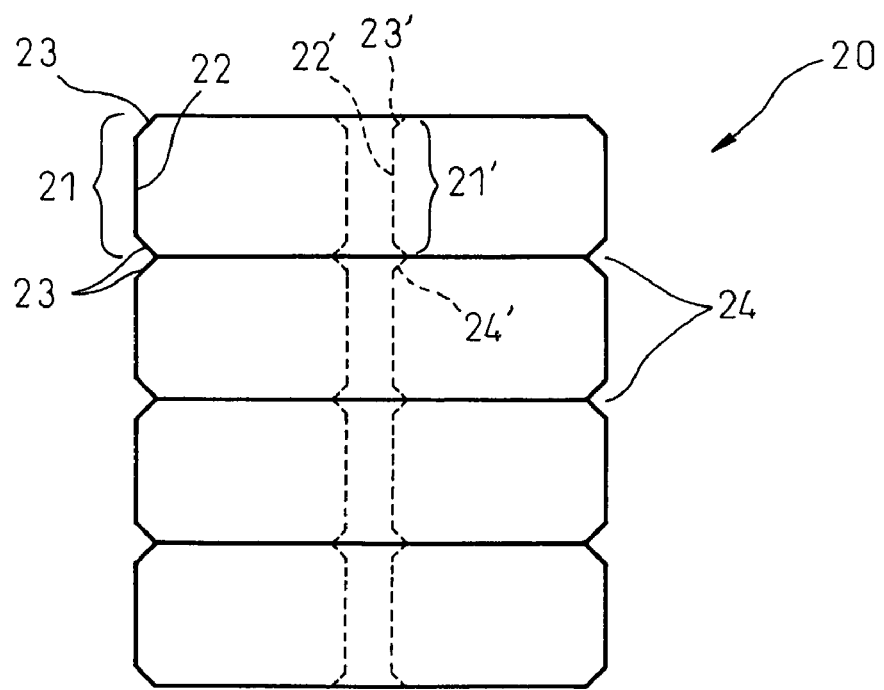
FIG. 2 is a cross-sectional view of a substrate in a state where the substrates to be polished are stacked together.
1 upper cylinder
2 lower cylinder
3 jig
4 polishing medium
5 substrate
6 cylinder control unit
10 grain flow processing device
21 outer peripheral end surface
22 end edge surface
23 chamfered portions

The method of polishing the end surfaces of the substrate for a recording medium of the present invention is based on a so-called "grain flow processing method" by bringing the substrate into contact with a polishing medium flows obtained by dispersing polishing grains in a viscoelastic resin carrier while the polishing medium flows. The "grain flow processing method" itself has long been known for deburring metal parts. The polishing medium is the one obtained by dispersing polishing grains, such as of diamond or silicon carbide, in a half-solid viscoelastic resin material having fluidity. FIG. 1 is a perspective view of a device used for the grain flow processing. FIG. 2 is a cross-sectional view of a substrate in a state where the substrates that are to be polished by the polishing method of the present invention are stacked. The grain flow processing device 10 shown in FIG. 1 includes an upper cylinder 1, a lower cylinder 2, and a jig 3 incorporated in a cavity in which the upper and lower cylinders 1 and 2 freely move in two directions as indicated by arrows. Further, the grain flow processing device 10 includes a cylinder control unit 6 which so controls the upper and lower cylinders 1 and 2 as to move at a preset speed, and wherein a substrate 5 for a recording medium that is to be polished is fixed between the upper and lower cylinders 1, 2, and a polishing medium 4 obtained by mixing the polishing grains into the viscoelastic resin carrier having both viscosity and elasticity, is introduced into between the upper and lower cylinders 1, 2. The viscoelastic resin carrier is a viscoelastic polymer material of, for example, a silicone resin.

In this constitution, the polishing medium 4 is pressed by the upper and lower cylinders 1, 2 and moves over all the surfaces of the substrate 5 for a recording medium inclusive of the inner peripheral end surface and the outer peripheral end surface while being press-contacted thereto. Due to this movement, the inner peripheral end surface and the outer peripheral end surface of the substrate 5 for the recording medium 5 are finished like mirror surfaces. This removes the roughness from the surfaces, and the substrate 5 is suppressed from forming particles. In the chamfered portions 23 on the outer peripheral end surfaces (see FIG. 2), the corners are rounded, which prevents the formation of particles when the substrate 5 comes in contact with other articles. The upper and lower cylinders 1 and 2 are controlled as to move at a speed that has been set in the cylinder control unit 6 in advance.

Namely, as the upper and lower cylinders 1 and 2 move at a constant speed, the medium 4 flows at a constant speed, too. Accordingly, even when the viscosity and kind of the medium 4 are changed, the flow speed remains constant and the polishing conditions are not changed. Thus, a stable polishing precision is obtained.

The control by the cylinder control unit 6 may be for maintaining constant the speed of the upper and lower cylinders 1 and 2. Therefore, no complex control unit is necessary for effecting the control and maintaining correlation among the detected data such as the processing pressure, temperature of the medium 4 and the like. In other words, the upper and lower cylinders 1 and 2 can be controlled by using simply constituted control means.

As shown in FIG. 2, further, a stacked body 20 is formed by stacking a plurality of substrates to treat many substrates simultaneously with good working efficiency. Referring, here, to FIG. 2, the outer peripheral end surface 21 of each substrate is constituted by an end edge surface 22 and chamfered portions 23. The inner peripheral end surface 21', too, is constituted by an end edge surface 22' and chamfered portions 23'. Dented portions 24, 24' are formed between the end surfaces 21, 21' of the upper and lower substrates, and may often not be polished to a sufficient degree by the grains moving in the up-and-down direction of the stacked body 20. In this case, the stacked body is rotated with the center hole of the stacked substrates as an axis to favorably polish the chamfered portions 23, 23', too.

The end surfaces of the substrate are finished like a mirror after a circular hole in the central portion of the glass substrate is formed and the inner peripheral end surface and the outer peripheral end surface are chamfered. Thereafter, the recording surfaces of the substrate may be subjected to the polishing and, as required, are, further, chemically reinforced by using a chemical reinforcing solution such as of potassium nitrate or sodium nitrate.

The magnetic recording medium is produced by successively overlaying an underlying layer, a magnetic layer, a protection layer and a lubricating layer on the substrate that is obtained as described above. As the underlying layer, there can be usually used such a nonmagnetic material as Cr, Mo, Ta, W, V, B or Al though this is not to impose any limitation. As the magnetic layer, there can be used a magnetic film comprising Co as a chief component. As the protection layer, there can be used a Cr film or a carbon film. As the lubricating layer, there can be used the one formed by diluting a perfluoroether which is a liquid lubricant with a fluoro-type solvent, applying it and drying it.

EXAMPLES

The method of the present invention will be described in further detail by way of an Example which, however, does not limit the invention.

Example 1

Thirty pieces of substrates (TS-10SX manufactured by Ohara Co.) for a hard disk (HD) each having a diameter (outer diameter) of 21.6 mm, a diameter (inner diameter of the center hole) of 6 mm and a thickness of 0.421 mm, were stacked and were finished on their end surfaces as mirror surfaces by using a grain flow processing device (EX-100 manufactured by Extrude-Horn Co.) shown in FIG. 1 under the conditions described below. The outer peripheral end surface and the inner peripheral end surface of the substrate included an end edge surface of 0.181 mm and chamfered portions of 0.120 mm on both sides thereof, respectively.

Polishing:

1. Polishing medium.
Kind of grains, size: diamond, #600 (average grain size, 30 μm)
Viscoelastic resin: Article No. EH020854

2. Grain flow processing device.
Cylinder diameter: 15 cm in diameter

3. Conditions in the device.
Temperature: 25° C.
Pressure: 3 MPa
Polishing time: 120 minutes In the above Example, the surfaces were observed for defects. The surfaces were observed for defects by using a microscope manufactured by Olympus Co. at a magnification of 200 times. The polished surfaces were completely free of scars or pits.

In the invention, further, no residue of a polishing material, such as cerium oxide, was adhered. This means that when the substrate for a recording medium is used, to satisfy the requirement of high reliability, the reliability is not deteriorated by the residue of the polishing material, which is particularly desirable. Besides, the inner peripheral end surface and the outer peripheral end surface can be polished simultaneously offering advantage from the standpoint of operation efficiency. Unlike the conventional polishing method using a brush, further, the Example favorably polishes even a substrate having a very small diameter (e.g., inner diameter of 7 mm).

The invention claimed is:

1. A method of polishing end surfaces of a substrate for a recording medium by a grain flow processing method wherein a plurality of substrates for a disk-like recording medium having a circular hole at the center portion thereof are stacked, both of inner peripheral end surfaces and outer peripheral end surfaces of said substrates are brought into contact with a polishing medium obtained by dispersing polishing grains in a viscoelastic resin carrier, and said polishing medium flows reciprocally in a stacking direction of said substrates, while the stacked body is rotated with the center hole of the stacked substrates as an axis, thereby to polish said inner peripheral end surfaces and said outer peripheral end surfaces.

2. The method of polishing end surfaces of a substrate for a recording medium according to claim 1, wherein said polishing grains are diamond grains.

3. The method of polishing end surfaces of a substrate for a recording medium according to claim 1, wherein the diameter of said circular hole is not larger than 7 mm.

4. A method of producing a substrate for a recording medium by using the polishing method of claim 1.

* * * * *